(12) United States Patent
Wei et al.

(10) Patent No.: US 11,863,970 B2
(45) Date of Patent: Jan. 2, 2024

(54) SYSTEM INFORMATION TO SUPPORT SERVICE BASED CELL RESELECTION

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 16/763,992

(22) PCT Filed: Nov. 15, 2018

(86) PCT No.: PCT/EP2018/081460
§ 371 (c)(1),
(2) Date: May 14, 2020

(87) PCT Pub. No.: WO2019/096946
PCT Pub. Date: May 23, 2019

(65) Prior Publication Data
US 2020/0396751 A1    Dec. 17, 2020

(30) Foreign Application Priority Data
Nov. 15, 2017 (EP) .................................... 17201917

(51) Int. Cl.
| | | |
|---|---|---|
| *H04W 72/12* | (2023.01) | |
| *H04W 72/1268* | (2023.01) | |
| *H04L 1/1607* | (2023.01) | |
| *H04W 36/08* | (2009.01) | |
| *H04W 48/12* | (2009.01) | |
| *H04W 48/20* | (2009.01) | |

(52) U.S. Cl.
CPC ....... *H04W 72/1268* (2013.01); *H04L 1/1614* (2013.01); *H04W 36/08* (2013.01); *H04W 48/12* (2013.01); *H04W 48/20* (2013.01)

(58) Field of Classification Search
CPC .............................. H04W 48/12; H04W 48/10
USPC ......................................... 455/422.1; 370/252
See application file for complete search history.

(56) References Cited

U.S. PATENT DOCUMENTS

2010/0220683 A1* 9/2010 Novak .................. H04L 1/1812
370/336
2014/0362756 A1* 12/2014 Maeda .................. H04W 48/12
370/312

(Continued)

FOREIGN PATENT DOCUMENTS

| CN | 102960024 A | 3/2013 |
| CN | 105874842 A | 8/2016 |

(Continued)

OTHER PUBLICATIONS

International Search Report and Written Opinion dated Feb. 6, 2019 for PCT/EP2018/081460 filed on Nov. 15, 2018, 16 pages.

(Continued)

*Primary Examiner* — Kiet M Doan
(74) *Attorney, Agent, or Firm* — XSENSUS LLP (57) ABSTRACT

A base station for a mobile telecommunications system has circuitry configured to communicate with at least one user equipment. The circuitry is further configured to transmit minimum system information having a bitmap indicating at least one service provided by a cell.

8 Claims, 5 Drawing Sheets

(56) References Cited

U.S. PATENT DOCUMENTS

| | | | |
|---|---|---|---|
| 2016/0165521 A1* | 6/2016 | Choi | H04W 48/10 |
| | | | 455/434 |
| 2017/0105166 A1* | 4/2017 | Lee | H04W 68/005 |
| 2017/0294998 A1* | 10/2017 | Etemad | H04W 52/0209 |
| 2018/0234954 A1* | 8/2018 | Takeda | H04W 48/08 |
| 2019/0090218 A1* | 3/2019 | Noh | H04W 88/06 |
| 2019/0116592 A1* | 4/2019 | Moon | H04L 5/00 |
| 2019/0159110 A1* | 5/2019 | Takahashi | H04W 48/14 |
| 2019/0223094 A1* | 7/2019 | Ingale | H04W 48/20 |

FOREIGN PATENT DOCUMENTS

| | | |
|---|---|---|
| CN | 106465258 A | 2/2017 |
| EP | 2077695 A1 | 7/2009 |
| JP | 2017514396 A | 6/2017 |
| WO | 2010/120689 A2 | 10/2010 |
| WO | 2011/083664 A1 | 7/2011 |
| WO | 2015/066383 A1 | 5/2015 |
| WO | 2017/174447 A1 | 10/2017 |

OTHER PUBLICATIONS

ETSI MCC, "Draft Report of 3GPP TSG-RAN WG2 NB-IOT Ad-hoc Meeting#2 Sophia-Antipolis, France, May 3-4, 2016," 3GPP TSG-RAN Working Group 2 meeting #94, R2-163302, Nanjing, China, May 23-27, 2016, 135 pages.

Samsung, "Cell Re-selection: Service Specific Frequency Prioritisation in NR," 3GPP TSG-RAN WG2 #99bis, R2-1710104, Resubmission of R2-1707687, Prague, Czech Republic, Oct. 9-13, 2017, 2 pages.

Huawei and Hisilicon, "Slice Availability for Cell Reselection," 3GPP TSG-RAN WG2#99bis, R2-1710221, Prague, Czech Republic, Oct. 9-13, 2017, 3 pages.

Huawei and Hisilicon, "Service-based camping," 3GPP TSG-RAN WG2 Meeting #99bis, R2-1710469, Resubmission of R2-1708077, Prague, Czech Republic, Oct. 9-13, 2017, 2 paes.

Sony, "Service based cell reselection," 3GPP TSG RAN WG2 NR Ad hoc 0118, R2-1800986, Vancouver, Canada, Jan. 22-26, 2018, 2 pages.

3GPP, "LTE; Evolved Universal Terrestrial Radio Access (E-UTRA); User Equipment (UE) procedures in idle mode" ETSI Technical Specification 36.304, Version 14.4.0, Release 14, Oct. 2017, pp. 1-59.

3GPP, LTE; Evolved Universal Terrestrial Radio Access (E-UTRA); Radio Resource Control (RRC); Protocol specification, ETSI Technical Specification 36.331, Version 14.4.0, Release 14, Oct. 2017, pp. 1-760.

ZTE, ZTE Microelectronics, Service sensitive cell selection and reselection in NR "3GPP TSG-RAN WG2# 97 R2-1701388" Feb. 17, 2017.

Samsung, Cell Selection & Reselection in NR , 3GPP TSG RAN WG2 NR, Spokane, USA, Jan. 17-19, 2017, R2-1700020, Jan. 6, 2017, 6 pages.

* cited by examiner

SYSTEM INFORMATION TO SUPPORT SERVICE BASED CELL RESELECTION

CROSS-REFERENCE TO RELATED APPLICATIONS

The present application is based on PCT filing PCT/EP2018/081460, filed Nov. 15, 2018, which claims priority to EP 17201917.6, filed Nov. 15, 2017, the entire contents of each are incorporated herein by reference.

TECHNICAL FIELD

The present disclosure generally pertains to a base station and user equipment.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system may be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like. In this concept a cell is served, for example, by a user equipment ("UE"), e.g. a mobile phone, a computer, tablet, tablet personal computer or the like including a mobile communication interface, or any other device which is able to perform a mobile telecommunication via, for example, LTE(-A) or NR, such as a hot spot device with a mobile communication interface.

A logical separation between control plane and user plane has been done in accordance with introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station may provide a link of the control plane.

Furthermore it is known that a cell (e.g. a normal cell, a virtual cell, etc.) is configured to provide one or more predefined services, such as D2D (device-to-device), MBMS (multimedia broadcast multicast service), eMBB (enhanced mobile broadband), URLLC (ultra-reliable low-latency communication), etc.

It is assumed that the services, which are supported by a cell, will be various and that new services may be introduced in the future.

Generally, there are several approaches known to indicate the services provided by a cell.

For instance, in a 3GPP RAN2 NR-Adhoc#1 meeting, the following agreements on system information have been reached:

1. As in LTE, UE can prioritize a frequency based on service. On the selected frequency the UE attempts to camp on the best cell.
2. Suitability criterion: Cell quality is above a threshold; Cell is not barred; Cell belongs to selected/R (E) PLMN. Other conditions (if any) are FFS (for further study).
3. Cell broadcasts (e.g. in minimum SI) the service(s) supported by it.

In LTE a certain level of cell selection/reselection based on services is supported e.g. for MBMS, and CSG (closed subscriber group). For instance, from document 3GPP TS 36.331 V14.4.0 (2017-09), "3rd Generation Partnership Project; Technical Specification Group Radio Access Network; Evolved Universal Terrestrial Radio Access (E-UTRA); Radio Resource Control (RRC); Protocol specification (Release 14)", section 5.2.1.1 it is known that if the UE is receiving or interested to receive an MBMS service in a cell, the UE shall apply the system information acquisition and change monitoring procedure to acquire parameters relevant for MBMS operation and apply the parameters acquired from system information only for MBMS operation for this cell.

From document 3GPP TS 36.304 V14.4.0 (2017-09), "3rd Generation Partnership Project; Technical Specification Group Radio Access Network; Evolved Universal Terrestrial Radio Access (E-UTRA); User Equipment (UE) procedures in idle mode (Release 14)", it is known that if the UE is capable either of MBMS Service Continuity or of SC-PTM (Single Cell Point To Multipoint) reception and is receiving or interested to receive an MBMS service and can only receive this MBMS service while camping on a frequency on which it is provided, the UE may consider that frequency to be the highest priority during the MBMS session as long as two conditions are fulfilled, which are further defined in this document.

Furthermore, there exist a couple of suggestions for dealing with the indication of services provided by a cell to the UE, as can be exemplary found in 3GPP documents TDoc R2-1710104, R2-1710469, and R2-1710221.

Although, technologies for signalling of services provided by a cell are known, it is generally desirable to improve known signaling and messaging methods.

SUMMARY

According to a first aspect, the disclosure provides a base station for a mobile telecommunications system comprising circuitry configured to communicate with at least one user equipment, wherein the circuitry is further configured to transmit minimum system information including a bitmap indicating at least one service provided by a cell.

According to a second aspect, the disclosure provides a user equipment for a mobile telecommunications system comprising circuitry configured to communicate with at least one base station, wherein the circuitry is further configured to receive minimum system information including a bitmap indicating at least one service provided by a cell; and determine to select the cell based on the bitmap included in the minimum system information.

According to a third aspect, the disclosure provides a base station for a mobile telecommunications system comprising circuitry configured to communicate with at least one user equipment, wherein the circuitry is further configured to transmit scheduling information, the scheduling information being indicative of at least one service provided by a cell.

According to a fourth aspect, the disclosure provides a user equipment for a mobile telecommunications system comprising circuitry configured to communicate with at least one base station, wherein the circuitry is further configured to receive scheduling information, the scheduling information being indicative of at least one service provided by a cell; and determine to select the cell based on the received scheduling information.

According to a fifth aspect, the disclosure provides a base station for a mobile telecommunications system comprising circuitry configured to communicate with at least one user equipment, wherein the circuitry is further configured to transmit information in a master information block indicating that a cell is a service dedicated cell.

According to a sixth aspect, the disclosure provides a user equipment for a mobile telecommunications system comprising circuitry configured to communicate with at least one base station, wherein the circuitry is further configured to receive information in a master information block indicating that a cell is a service dedicated cell; and determine at least one service supported by the service dedicated cell, based on the received information.

According to a seventh aspect, the disclosure provides a base station for a mobile telecommunications system comprising circuitry configured to communicate with at least one user equipment, wherein the circuitry is further configured to transmit minimum system information including at least one bit indicating that a cell is a service dedicated cell; and transmit service related information in an on demand system information.

According to an eighth aspect, the disclosure provides a user equipment for a mobile telecommunications system comprising circuitry configured to communicate with at least one base station, wherein the circuitry is further configured to receive minimum system information including at least one bit indicating that a cell is a service dedicated cell; and request on demand system information including service related information, based on the at least one bit included in the minimum system information.

According to a ninth aspect, the disclosure provides a user equipment for a mobile telecommunications system comprising circuitry configured to communicate with at least one base station, wherein the circuitry is further configured to select a communication frequency, based on a service; camp on a cell using the selected communication frequency; receive system information including service related information; and determine, based on the service related information, whether the cell on which it is camped provides an expected service.

According to a tenth aspect, the disclosure provides a user equipment for a mobile telecommunications system comprising circuitry configured to communicate with at least one base station, wherein the circuitry is further configured to receive system information including service related information; and select a cell, based on the service related information.

According to an eleventh aspect, the disclosure provides a user equipment for a mobile telecommunications system comprising circuitry configured to communicate with at least one base station, wherein the circuitry is further configured to determine, upon transition from an idle state or inactive state into a connection state, whether an expected service is provided by the connected cell based on service related information included in system information received before transition into the connection state.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
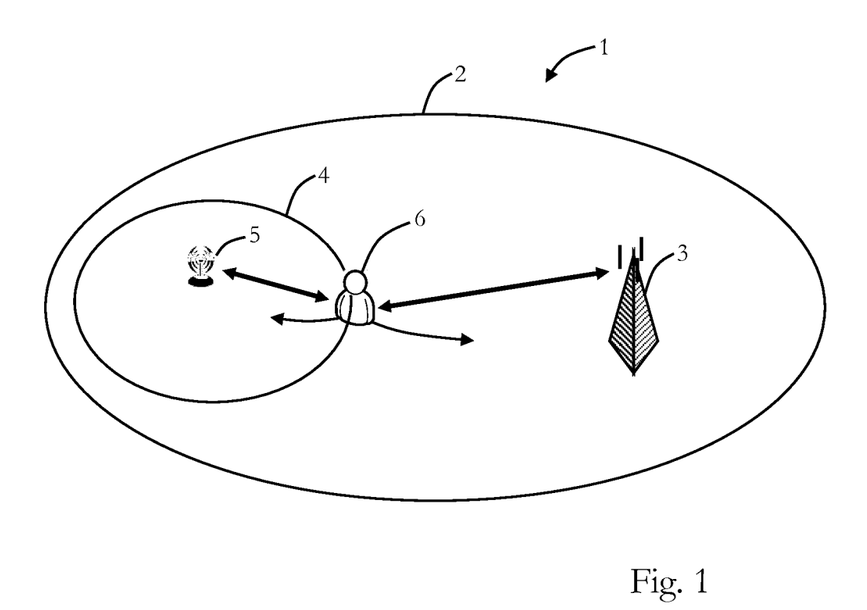
FIG. 1 illustrates an embodiment of a RAN.

Before a detailed description of the embodiments under reference of FIG. 1 is given, general explanations are made.

As mentioned in the outset, in general, several generations of mobile telecommunications systems are known, and currently the fifth generation ("5G") is under development which might be put into practice in the year 2020.

As discussed, one candidate for providing the requirements of 5G is the so-called Long Term Evolution ("LTE"), while other candidates for meeting the 5G requirements are termed New Radio (NR) Access Technology Systems (NR), wherein an NR can be based on LTE technology, just as LTE was based on previous generations of mobile communications technology.

For the future, 3GPP plans to further develop LTE-A such that it will be able to fulfill the technical requirements of 5G.

As the 5G system may be based on LTE or LTE-A, respectively, it is assumed that specific requirements of the 5G technologies will, basically, be dealt with by features and methods which are already defined in the LTE and LTE-A standard documentation, such that some of the embodiments may rely on that technology.

As also discussed above, 5G technologies will allow a concept of a so called "virtual cell" or "local cell" or the like, which may be implemented in some embodiments, as well as a logical separation between control plane and user plane, wherein a macro or anchor base station may provide a link of the control plane.

Furthermore it is known that a cell (e.g. a normal cell, a virtual cell, etc.) is configured to provide one or more predefined services, such as D2D (device-to-device), MBMS (multimedia broadcast multicast service), eMBB (enhanced mobile broadband), URLLC (ultra-reliable low-latency communication), etc., which is implemented in some embodiments.

As discussed, it is assumed that the services, which are supported by a cell, will be various and that new services may be introduced in the future and it has been recognized that the approaches discussed in the outset for signalling services may be improved.

Furthermore, it is known that in NR on demand system information (SI) will be introduced and it is envisaged that service related SI might not be always broadcasted. From 3GPP agreements it can be taken that a bitmap may be introduced to indicate whether a system information block (SIB) is always broadcasted or is transmitted via on demand. However, it has been recognized that based on this information the UE does not know whether a related SIB is provided on demand or cannot be provided, since, e.g. related services are not supported.

Therefore, in some embodiments, an indication is introduced which relates to additional services, as will also be discussed in the following. In some embodiments, the indication is allowed to be forward compatible and may allow to saving the signalling cost.

In some embodiments, discussed further below, system information is a type of control information. In the current LTE, the system information is broadcasted in so called System Information Blocks (SIB), which are, for example:

MIB (Master Information Block): physical layer information of a LTE cell, e.g. transmission bandwidth configuration, system frame number etc.

SIB1: information regarding whether or not UE is allowed to access the LTE cell, defines scheduling of the other SIBs, and carries cell ID, SIB mapping information, etc.

SIB2: common channel and shared channel information

There exist further blocks, e.g. SIB4 to SIB19 in LTE, which are generally known.

In some embodiments, also for LTE-A, NR or next generation systems it is assumed that such kind of system information is implemented (at least in an analogue manner).

In some embodiments, minimum system information is used, which may basically (only) include basic information, such as cell access information, cell select information, information for acquiring other SI (e.g. everything not in minimum SI) and the like.

Generally, in some embodiments, the base station may be based on the principles of LTE (LTE-A) and/or it may be based on NR RAT, as also discussed above. The base station may be based on the known eNodeB of LTE, as one example, or it may be based on the discussed NR eNodeB (the next generation base station may also be referred to as gNB). In some embodiments, the user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

Some embodiments pertain to a base station for a mobile telecommunications system including circuitry configured to communicate with at least one user equipment, wherein the circuitry is further configured to transmit minimum system information including a bitmap indicating at least one service provided by a cell.

Hence, services which are supported by the cell are indicated in the minimum system information, e.g. MIB or SIB1, in the format of a bitmap, such that, for example, a user equipment can use this information according to decide, whether it may access the cell or not.

The bitmap may include multiples bits (e.g. a multiple of 8, such as 16, 32, 64, or the like), wherein each bit (or in some embodiments different numbers) indicates an associated service (e.g. D2D, MBMS, eMBB, URLLC, etc.), which is provided by the cell.

The bitmap may also include multiple bits, wherein each bit indicates an associated group (or subset) of services provided by the cell. Such a group (or subset) may include, for example, D2D services or another group referring to specific services. Thereby, the bitmap may be further compressed.

The bitmap may also indicate a subset of services which will be designated to be considered in service based cell selection, for example, the 3GPP specification will define that for only MBMS, V2X, URLLC services, this mechanism is applied. Then with this restriction, the bitmap may be further compressed in some embodiments.

In some embodiments, also a mixture is implemented, e.g. a first are of the bitmap directly indicates a supported service, while another area of the bitmap is reserved for indicating groups of services.

Some embodiments pertain to a user equipment for a mobile telecommunications system including circuitry configured to communicate with at least one base station, wherein the circuitry is further configured to receive minimum system information including a bitmap indicating at least one service provided by a cell; and determine to select the cell based on the bitmap included in the minimum system information.

Hence, the user equipment may be able to decide in advance, i.e. before connection to the cell, whether the cell provides an expected service.

As discussed, the bitmap may include multiples bits, wherein each bit indicates an associated service, which is provided by the cell, or the bitmap may include multiple bits, wherein each bit indicates an associated group of services provided by the cell.

Some embodiments pertain to a base station for a mobile telecommunications system including circuitry configured to communicate with at least one user equipment, wherein the circuitry is further configured to transmit scheduling information, the scheduling information being indicative of at least one service provided by a cell.

Hence, the scheduling information may always include information which is indicative of the at least one service provided by the cell, irrespective whether the transmission of the system information generally has to be scheduled or not. That means that the user equipment may learn based on the scheduling information alone whether a cell provides an expected service or not.

The services supported by the cell may be indicated in the SIB (corresponding to that service), e.g. in the scheduling information in SIB1.

The scheduling information may include scheduling information for a system information block, the system information block including service related information (SIB corresponding to the at least one service) for the at least one service provided by the cell.

Some embodiments pertain to a user equipment for a mobile telecommunications system including circuitry configured to communicate with at least one base station, wherein the circuitry is further configured to receive scheduling information, the scheduling information being indicative of at least one service provided by a cell; and determine to select the cell based on the received scheduling information, as discussed.

Hence, the user equipment can already decide based on the scheduling information whether a cell provides an expected service and, thus, it can determine whether the cell is to be accessed or not.

As discussed, the scheduling information may include scheduling information for a system information block, the system information block including service related information for the at least one service provided by the cell.

Some embodiments pertain to a base station for a mobile telecommunications system including circuitry configured to communicate with at least one user equipment, wherein the circuitry is further configured to transmit information in a master information block indicating that a cell is a service dedicated cell.

Hence, for instance, based on the information that the cell is a service dedicated cell, i.e. a cell which may provide at least one specific service, a user equipment can decide whether it wants to have more information about the service(s), e.g. since the user equipment needs a specific service.

The information may include one bit for indicating that the cell is a service dedicated cell.

The circuitry may be further configured to transmit system information including a bitmap indicating at least one service provided by the service dedicated cell (the bitmap may have the characteristics as also discussed further above).

The bitmap may be included in a system information block which is associated with the service dedicated cell.

The bitmap may be included in scheduling information (e.g. SIB1).

Hence, in some embodiments one bit (e.g. a service dedicated bit) is included in the MIB to indicate whether the cell is a service dedicated cell. Then a bitmap is further included, for example, in the SIB1 to indicate the supported service(s) or the supported services are indicated in the SIB (corresponding to that service) scheduling information in SIB1 as also discussed above.

Some embodiments pertain to a user equipment for a mobile telecommunications system including circuitry configured to communicate with at least one base station, wherein the circuitry is further configured to receive information in a master information block indicating that a cell is a service dedicated cell; and determine at least one service supported by the service dedicated cell, based on the received information.

As discussed, the information may include one bit for indicating that the cell is a service dedicated cell. As discussed, the circuitry may be further configured to receive system information including a bitmap indicating at least one service provided by the service dedicated cell. The at least one service may be determined, based on the bitmap, as discussed. The bitmap may be included in a system information block, which is associated with the service dedicated cell, as discussed. The bitmap may be included in scheduling information.

Some embodiments pertain to a base station for a mobile telecommunications system including circuitry configured to communicate with at least one user equipment, wherein the circuitry is further configured to transmit minimum system information including at least one bit indicating that a cell is a service dedicated cell; and transmit service related information in an on demand system information.

For instance, one bit (e.g. service dedicated bit) is included in the minimum SI (e.g. MIB or SIB1) to indicate whether the cell is a service dedicated cell. Then the supported service(s) and/or service specific configurations if any (e.g. RACH resources, channel/subframe configuration) will be provided via on demand SIB according to a request transmitted by a user equipment.

Some embodiments pertain to a user equipment for a mobile telecommunications system including circuitry configured to communicate with at least one base station, wherein the circuitry is further configured to receive minimum system information including at least one bit indicating that a cell is a service dedicated cell; and request on demand minimum system information including service related information, based on the at least one bit included in the system information, as discussed.

Hence, the user equipment can at first check, based on the minimum system information including at least one bit indicating that a cell is a service dedicated cell, whether the cell generally provides a service and if it is identified as a service dedicated cell, it can request to receiver further information, based on an on demand system information request. The further information may then be transmitted, for example, in corresponding system information blocks.

Some embodiments pertain to a user equipment for a mobile telecommunications system including circuitry configured to communicate with at least one base station, wherein the circuitry is further configured to select a communication frequency, based on a service; camp on a cell using the selected communication frequency; receive system information including service related information (as discussed herein); and determine, based on the service related information, whether the cell on which it is camped provides an expected service.

As discussed, the service(s) supported by the cell(s) may be indicated in the system information, such as discussed above, e.g. in the MIB, SIB, SIB1, scheduling information, minimum system information.

Generally, in some embodiments, e.g. according to RAN2 agreements, a user equipment may prioritize a frequency based on a service, since, for example, specific services may be provided on specific frequencies. Furthermore, in some embodiments, the user equipment will camp on the cell having the corresponding frequency and the strongest signal (i.e. the "best" cell is selected).

Accordingly, the circuitry may be further configured to select another cell, when it is determined that the cell on which it is camped does not provide the expected service.

Furthermore, in some embodiments, the circuitry may be further configured to determine a random access preamble and/or physical channel resources based on the service related information. Thus, in some embodiments, a mapping between specific services and associated random access preambles is implemented, such that the user equipment may determine the random access preamble which is associated with a specific service.

Some embodiments pertain to a user equipment for a mobile telecommunications system including circuitry configured to communicate with at least one base station, wherein the circuitry is further configured to receive system information including service related information (as discussed herein); and select (may include access) a cell, based on the service related information.

Hence, before the user equipment may camp on a specific cell, it may be determined whether the cell provides an expected service, which is determined based on the service related information.

In some embodiments, multiple cells are present such that a cell among multiple cells may be selected, which provides an expected service and which provides the strongest signal.

As discussed, the service related information may be included in a master information block or system information block.

In some embodiments, the UE can select the second best cell, even if camped cell is not barred.

Moreover, in some embodiments, the UE may not be sure which service will require the connection in IDLE mode, such that the UE can perform a cell reselection on a different frequency while trying to access the cell and access class barring may be active for that service.

Some embodiments pertain to a user equipment for a mobile telecommunications system including circuitry configured to communicate with at least one base station, wherein the circuitry is further configured to determine, upon transition from an idle state or an inactive state into a connection state, whether an expected service is provided by the connected cell based on service related information included in system information received before transition into the connection state.

For instance, the idle state may an RRC_IDLE state and the inactive state may be a RRC_INACTIVE state (RRC=radio resource control) and the connection state may be a RRC_CONNECTED state.

The system information may be received, for example, upon access of the cell (or at another point of time before going into the connection state or even before going into an inactive or idle state) and the idle state or inactive state may be selected after a connection is terminated.

The circuitry may be further configured to select another cell, based on service related information received from the other cell, when the other cell provides the expected service. For example, if an application running on the user equipment requires a specific new service, before the user equipment goes back from the idle state to the connection state to its previously serving cell it checks whether the cell provides the required service, based on the system information which has been stored previously (or in some embodiments which is currently received). If it turns out that the required service is not provided, the user equipment may selected another cell which provides the expected (required) service.

The circuitry may be further configured to transmit a resume request to the other cell.

Returning to FIG. 1, a typical embodiment of an NR radio network RAN 1 is illustrated. The RAN 1 has a macro cell 2, which is established by a NR eNodeB 3, and an NR cell 4, which is established by an NR eNodeB 5. The NR eNodeB 3 serves in this example as an anchor base station which may also control the NR cell 4, which is slave cell in this specific embodiment, which is served by the slave NR eNodeB 5, without limiting the present disclosure in that regard. For instance, the NR eNodeB 3 may provide control plane communication, while the NR eNodeB 5 may provide user plane communication, also without limiting the present disclosure in that regard. In some embodiments, the NR eNodeB 3 as well as the NR eNodeB 5 may transmit system information, while in other embodiments, for instance, the NR eNodeB 3 and/or NR eNodeB 5 transmits minimum system information.

A user equipment UE 6 can communicate with the NR eNodeB 3 and, as long as it is within the NR cell 4, it can also communicate with the NR eNodeB 5. In some embodiments, each of the cells, such as cells 2 and 4 may provide specific services, which may also be associated with specific frequencies, as also discussed above.

Figure 2:
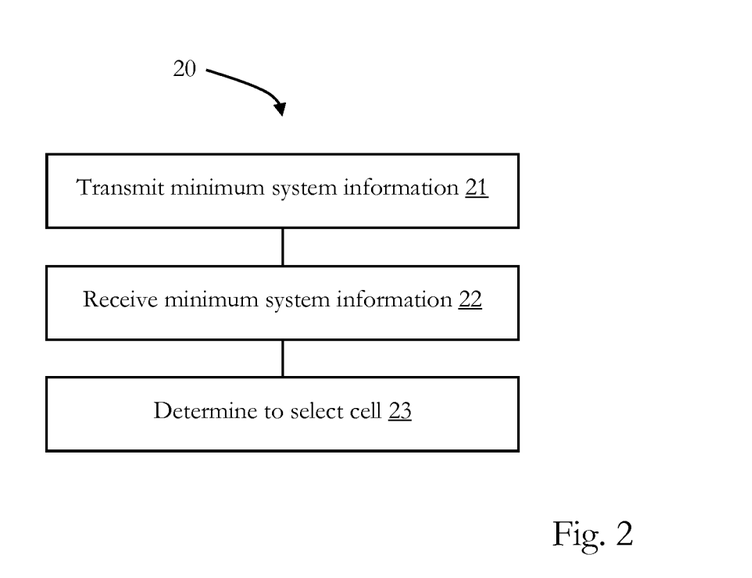
FIG. 2 illustrates an embodiment of a mobile telecommunications method, which is performed by a base station and a user equipment.

FIG. 2 illustrates an embodiment of a mobile telecommunications method 20, which may be performed by the base stations and user equipments as described herein, and within a RAN system as discussed herein, e.g. also under reference of FIG. 1.

At 21, the base station (e.g. NR eNodeB 3 and/or 5) transmits (e.g. broadcasts) a bitmap in the minimum SI (e.g. MIB or SIB1), for indicating services which are supported (provided) by the respective cell (e.g. 2 or 4) to a user equipment (e.g. UE 6), wherein the UE receives the minimum system information at 22.

With this option, a long enough indication (e.g. 32 bits) will be reserved in the bitmap for forward compatibility in this embodiment. Each bit of the bitmap represents the corresponding service (D2D, MBMS, eMBB, URLLC etc), which is supported or not (wherein service also includes network slices in some embodiments.

As discussed above, in other embodiments, a predefine service (slice) number mapping will is implemented, where for example, a "1" means a D2D service, a "2" means an MBMS service, etc.

As a further optimization, in some embodiments, only a subset of services will be indicated in the minimum SI whether the cell can support it or not, whereby the bitmap could be further compressed, as also discussed above.

At 23, the UE determines to select the cell, based on the bitmap included in the minim system information, i.e. if the cell provides an expected service, the UE will select and access the cell.

Figure 3:
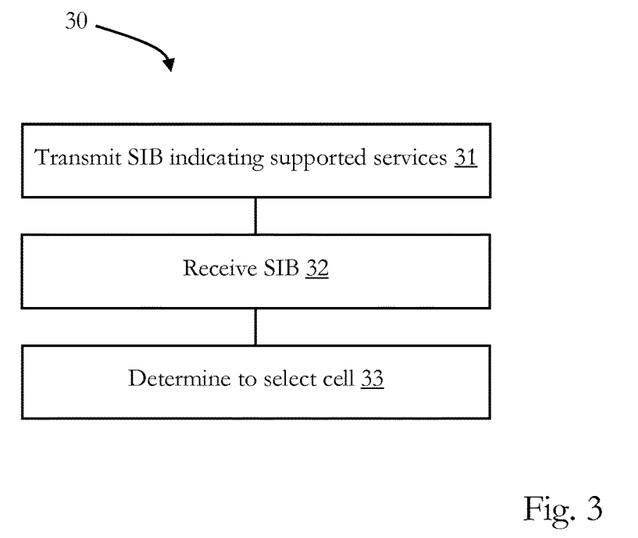
FIG. 3 illustrates another embodiment of a mobile telecommunications method, which is performed by a base station and a user equipment.

FIG. 3 illustrates another embodiment of a mobile telecommunications method 30, which may be performed by the base stations and user equipments as described herein, and within a RAN system as discussed herein, e.g. also under reference of FIG. 1.

At 31, the base station (e.g. NR eNodeB 3 and/or 5) transmits (e.g. broadcasts) an indication for the services supported by the cell (e.g. 2 or 4) in the SIB (corresponding to that service) scheduling information in SIB1 to a user equipment (e.g. UE 6), wherein the UE receives the SIB at 32.

With this option, no additional bitmap is needed in minimum SI as, for example, necessary for the embodiment of FIG. 2. Irrespective whether the service related SIB is to be scheduled or not, its scheduling information will be included in the SIB1, which, thus, can be checked by the UE. With this information, the UE can assume the corresponding services will be supported and can determine to select the corresponding cell at 33.

Figure 4:
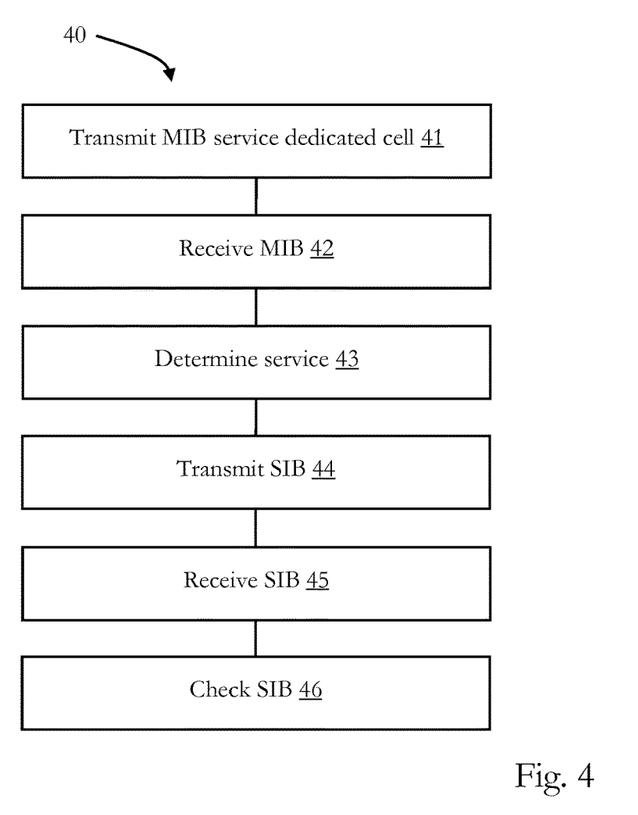
FIG. 4 illustrates another embodiment of a mobile telecommunications method, which is performed by a base station and a user equipment.

FIG. 4 illustrates another embodiment of a mobile telecommunications method 40, which may be performed by the base stations and user equipments as described herein, and within a RAN system as discussed herein, e.g. also under reference of FIG. 1.

At 41, the base station (e.g. NR eNodeB 3 and/or 5) transmits (e.g. broadcasts) in the MIB an indication that the cell (2 or 4) is a service dedicated cell to a user equipment (e.g. UE 6), wherein the UE receives the MIB at 42.

In this embodiment, one bit (service dedicated bit) is included in the MIB to indicate whether the cell is a service dedicated cell.

Then a bitmap is further included in the SIB1 to indicate the supported service(s) or the supported services are indicated in the SIB (corresponding to that service) scheduling information in SIB1 and this is transmitted to the UE at 44 and received by the UE at 45.

For service sensitive UEs, with the service dedicated bit in the MIB, the UE can decide at 43 whether it needs to check whether the expected services will be supported or not, since if the cell is a service dedicated cell it will only provide specific service(s). For service non-sensitive UEs, there is no need to read the corresponding information in SIB1 although it receives them at 45.

If the UE determines that the cell is a service dedicated cell, it will check at 46, whether the expected services are supported by reading the corresponding information in SIB1.

As another embodiment, for the one bit (service dedicated bit) included in the MIB, the agreed and known IFRI (Intra Frequency Reselection indicator) bit is reused. In a RAN2#99b meeting, the following agreements have been reached:

1: "cellBarred" IE (corresponding to "Information for quick identification that UE can't camp on the cell" in RAN1 LS) is present in the MIB and it has the same effect as the LTE "cellBarred" IE.

FFS Duration of the barring timer.

2: "intraFreqReselection" IE is present in the MIB and it has the same effect as the LTE "intraFreqReselection" IE FFS Whether additional "cellBarred" and "intraFreqReselection" IEs are signalled in NR SIB1

According to a current version of the RRC spec 3GPP TS 36.331 (3GPP TS 36.331 V14.4.0 (2017-09), "3rd Generation Partnership Project; Technical Specification Group Radio Access Network; Evolved Universal Terrestrial Radio Access (E-UTRA); Radio Resource Control (RRC); Protocol specification (Release 14)"), the cellBarred bit and IFRI bit are correlated:

— Indicates that intraFreqReselection is not allowed when cellBarred is set to barred.

intraFreqReselection ENUMERATED {allowed, notAllowed},

Hence, the UE will check the IFRI bit only if cellBarred bit is set to barred.

In the present embodiment, these two bits are decoupled.

For instance, the cellBarred bit is set to "not-barred" and the IFRI bit is set to allowed, while in the SIB1 the supported services are included.

The UE, although the cellBarred bit is set to "not barred", has to check whether the corresponding service is supported according to the information in the SIB1. Otherwise it will reselect, for example, the second best cell on the same frequency if it can provide the expected service.

Figure 5:
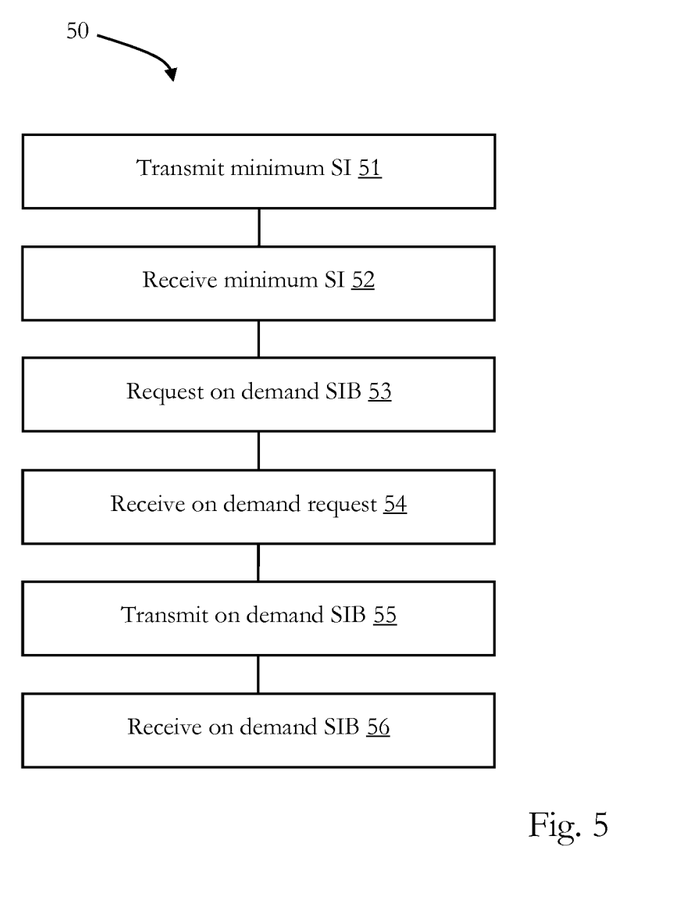
FIG. 5 illustrates another embodiment of a mobile telecommunications method, which is performed by a base station and a user equipment.

FIG. 5 illustrates another embodiment of a mobile telecommunications method 50, which may be performed by the base stations and user equipments as described herein, and within a RAN system as discussed herein, e.g. also under reference of FIG. 1.

At 51, the base station (e.g. NR eNodeB 3 and/or 5) transmits (e.g. broadcasts) in the minimum SI (e.g. MIB or SIB1) an indication in the form of one bit that the cell (2 or 4) is a service dedicated cell to a user equipment (e.g. UE 6), wherein the UE receives the minimum SI at 52.

Then the supported service(s) and/or service specific configurations (if any), such as RACH resources, channel/subframe configuration, or the like, will be provided via on demand SIB according to the UE's request.

Hence, service sensitive UEs can decide, based on the service dedicated bit in the minimum SI, whether it needs to further request the on demand service related SIB at 53. This on demand SI request is received at 54 by the base station which in response thereto transmits the on demand SIB at 55, which, in turn, is received by the UE at 56.

In contrast to that, service non-sensitive UEs will conduct the normal random access. In this embodiment, no additional bitmap is needed in the minimum SI.

As also discussed above, also in this embodiment (as in other embodiments), services can also refer to slices in NR.

Figure 6:
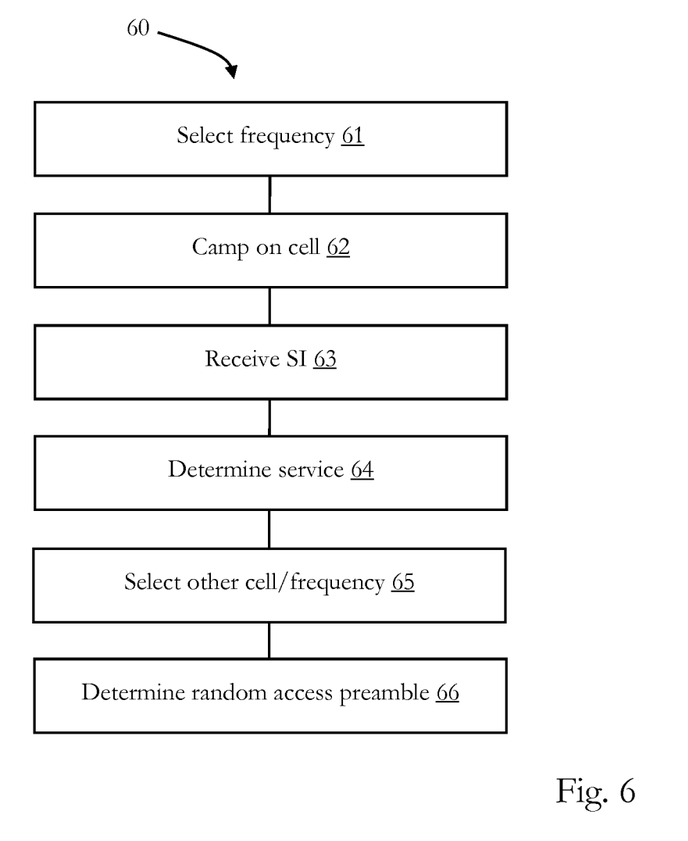
FIG. 6 illustrates another embodiment of a mobile telecommunications method, which is performed by a base station and a user equipment.

FIG. 6 illustrates another embodiment of a mobile telecommunications method 60, which may be performed by the base stations and user equipments as described herein, and within a RAN system as discussed herein, e.g. also under reference of FIG. 1.

As also discussed, according to RAN2 agreements, the UE can prioritize a frequency based on service and selects it accordingly at 61, and then the UE attempts to camp on the selected frequency on the best cell at 62, which is, for example, the cell providing the strongest signal.

Then, the UE further checks or determines at 64, whether an expected service (if the UE is service sensitive) is supported in this cell or not, based on an indication in system information received at 63. The service information or indication in the system information may be based on anyone of the embodiments described herein, such as those of anyone of FIGS. 2 to 5.

If the UE determines that the expected service is not supported, the UE will reselect, for example, the second best cell at 65 accordingly or selects a second prioritized frequency based on the service (e.g. jumping back to 61 or at 65 another frequency is selected).

Hence, based on the receiving of the service information or indication in the SI the following effects may be provided in some embodiments.

The services provided by a certain frequency may change. Hence, although the UE can store the carrier frequency-services information and use it for next camping, this information may be out-of-date. Furthermore, the services provided on a specific frequency may further included by means of e.g. deploying new cells, cell turn on/off, mobile cell etc., which has the consequence that cells with the best radio quality may not necessarily be the cells which can provide the expected services. In that case, the further check of the current or real time service related information in the SI may be beneficial.

Furthermore, the UE can decide or determine at 66 whether to send the random access preamble and/or which random access preamble is sent, if, e.g., the random access preamble is separated and a mapping according to services is implemented.

Figure 7:
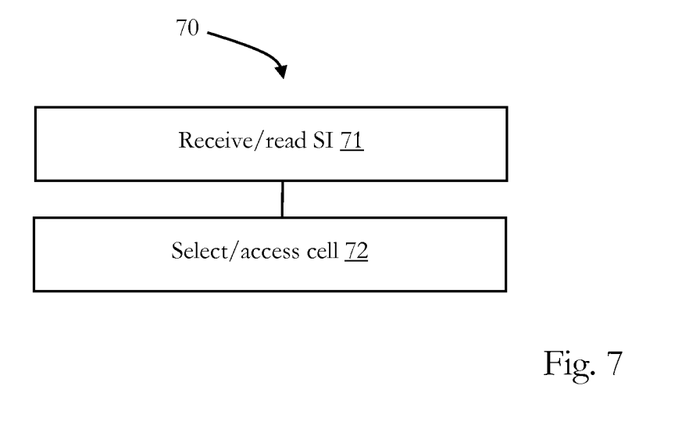
FIG. 7 illustrates another embodiment of a mobile telecommunications method, which is performed by a base station and a user equipment.

FIG. 7 illustrates another embodiment of a mobile telecommunications method 70, which may be performed by the base stations and user equipments as described herein, and within a RAN system as discussed herein, e.g. also under reference of FIG. 1.

For the UE, before deciding on camping on one cell, it receives and reads SI at 71 to confirm whether the expected service is supported or not, based on service information or indication included in the SI. The service information or indication in the system information may be based on anyone of the embodiments described herein, such as those of anyone of FIGS. 2 to 5. If one cell can provide the service related information of its neighbor cells in the system information, the UE can decide which cell is the most suitable cell to camp.

Then, the UE will select the best cell among the cells who can support its expected services at 72. In this embodiment, providing the service related information especially in MIB/SIB1 may be useful, since the UE does not need to read the other SIBs to further check the service related information and can directly select the suitable cell before accessing the cells, and avoids finding out that the service is not provided afterwards, i.e. after having accessed the cell.

Figure 8:
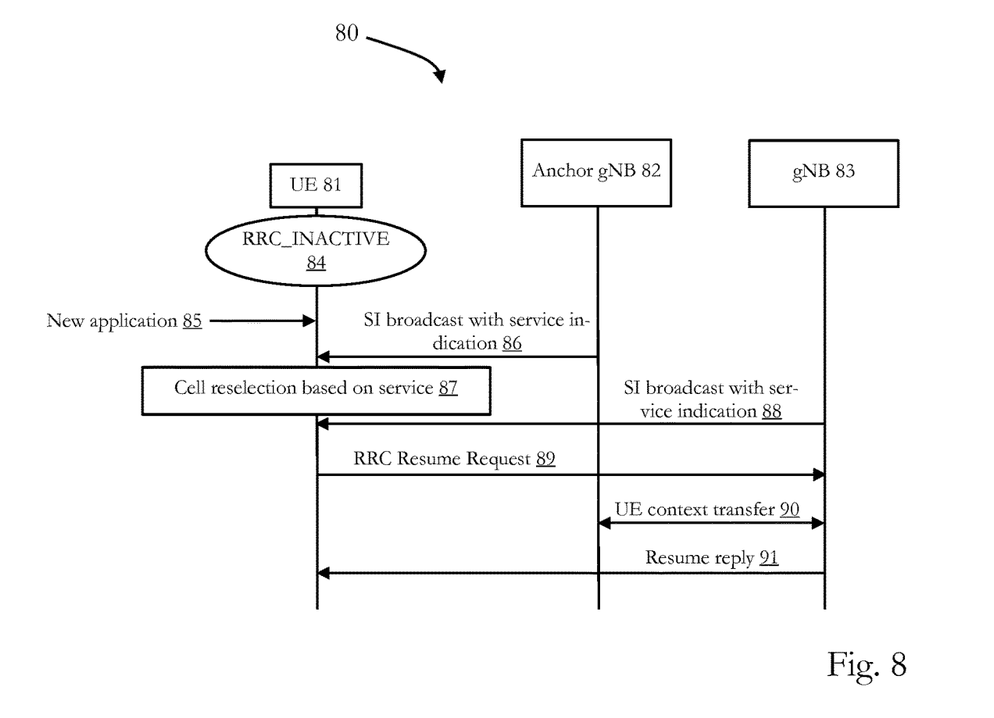
FIG. 8 illustrates another embodiment of a mobile telecommunications method, which is performed by a base station and a user equipment.

FIG. 8 illustrates another embodiment of a mobile telecommunications method 80, which may be performed by the base stations and user equipments as described herein, and within a RAN system as discussed herein, e.g. also under reference of FIG. 1.

The above description is also applicable to UEs in an idle state, such as an RRC_IDLE state, and/or to an inactive state, such as an RRC_INACTIVE state.

The UE 81 first camps on a frequency F1 of a cell, which is established by an anchor gNB 82, wherein the UE 81 is within the coverage (cell) of a further gNB 83.

At 84, the UE 81 goes to the RRC_INACTIVE state once a communication is finished.

The UE 81 in RRC_INACTIVE state may be triggered to go to RRC_CONNECTED state from an application layer at 82, e.g. since a new application is started which may require certain specific services.

The UE 81 can still check the services provided in the SI to decide whether a cell reselection is needed or not. Hence, at 86 the UE 81 first checks the service indication in the SI of its previously stored SI, which was received from gNB 82, and finds that the cell to which it is connected is not able to provide the expected service(s), wherein the service information or indication in the system information may be based on anyone of the embodiments described herein, such as those of anyone of FIGS. 2 to 5.

As the current cell does not support the needed service(s), the 81 UE starts at 87 to check the SI received at 88 from neighboring gNBs and finds that gNB 83 can provide the services. The UE 81 selects the best cell on the frequency F2, which is established by gNB 83, and sends at 89 an RRC resume request to the gNB 83. The gNB 83 asks at 90 the anchor gNB 82 for the UE context and sends at 91 a resume reply to the UE 81 afterwards.

Hence, in some embodiments, with the supported services indication included in the SI, the UE can decide whether it would access the cell or not. In some embodiments, the service indication is designed to reduce the signalling cost.

Figure 9:
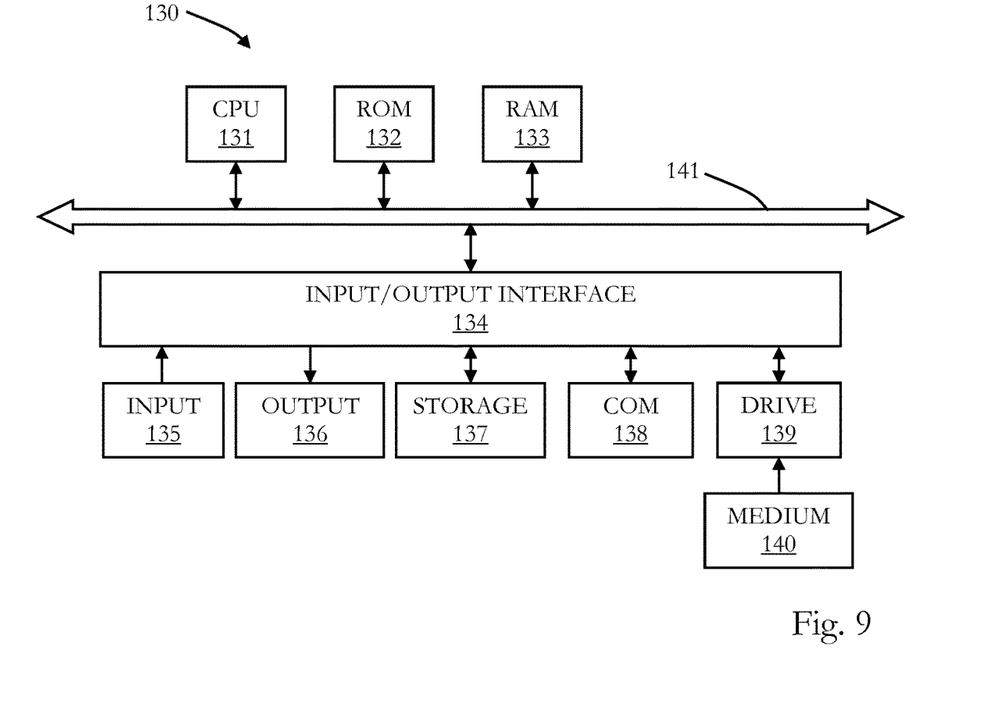
FIG. 9 illustrates an embodiment of a multi-purpose computer which can be used for implementing a base station and a user equipment.

In the following, an embodiment of a general purpose computer 130 is described under reference of FIG. 9. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a softwarecontrolled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system comprising circuitry configured to communicate with at least one user equipment, wherein the circuitry is further configured to:
 transmit minimum system information including a bitmap indicating at least one service provided by a cell.

(2) The base station of (1), wherein the bitmap includes multiples bits, wherein each bit indicates an associated service, which is provided by the cell.

(3) The base station of (1), wherein the bitmap includes multiple bits, wherein each bit indicates an associated group of services provided by the cell.

(4) A user equipment for a mobile telecommunications system comprising circuitry configured to communicate with at least one base station, wherein the circuitry is further configured to:
 receive minimum system information including a bitmap indicating at least one service provided by a cell; and
 determine to select the cell based on the bitmap included in the minimum system information.

(5) The user equipment of (4), wherein the bitmap includes multiples bits, wherein each bit indicates an associated service, which is provided by the cell.

(6) The user equipment of (4), wherein the bitmap includes multiple bits, wherein each bit indicates an associated group of services provided by the cell.

(7) A base station for a mobile telecommunications system comprising circuitry configured to communicate with at least one user equipment, wherein the circuitry is further configured to:
 transmit scheduling information, the scheduling information being indicative of at least one service provided by a cell.

(8) The base station of (7), wherein the scheduling information includes scheduling information for a system information block, the system information block including service related information for the at least one service provided by the cell.

(9) A user equipment for a mobile telecommunications system comprising circuitry configured to communicate with at least one base station, wherein the circuitry is further configured to:
 receive scheduling information, the scheduling information being indicative of at least one service provided by a cell; and
 determine to select the cell based on the received scheduling information.

(10) The user equipment of (9), wherein the scheduling information includes scheduling information for a system information block, the system information block including service related information for the at least one service provided by the cell.

(11) A base station for a mobile telecommunications system comprising circuitry configured to communicate with at least one user equipment, wherein the circuitry is further configured to:
 transmit information in a master information block indicating that a cell is a service dedicated cell.

(12) The base station of (11), wherein the information includes one bit for indicating that the cell is a service dedicated cell.

(13) The base station of (11) or (12), wherein the circuitry is further configured to transmit system information including a bitmap indicating at least one service provided by the service dedicated cell.

(14) The base station of (13), wherein the bitmap is included in a system information block which is associated with the service dedicated cell.

(15) The base station of (14), wherein the bitmap is included in scheduling information.

(16) A user equipment for a mobile telecommunications system comprising circuitry configured to communicate with at least one base station, wherein the circuitry is further configured to:
 receive information in a master information block indicating that a cell is a service dedicated cell; and
 determine at least one service supported by the service dedicated cell, based on the received information.

(17) The user equipment of (16), wherein the information includes one bit for indicating that the cell is a service dedicated cell.

(18) The user equipment of (16) or (17), wherein the circuitry is further configured to receive system information including a bitmap indicating at least one service provided by the service dedicated cell.

(19) The user equipment of (18), wherein the at least one service is determined, based on the bitmap.

(20) The user equipment of (18) or (19), wherein the bitmap is included in a system information block which is associated with the service dedicated cell.

(21) The user equipment of (20), wherein the bitmap is included in scheduling information.

(22) A base station for a mobile telecommunications system comprising circuitry configured to communicate with at least one user equipment, wherein the circuitry is further configured to:
 transmit minimum system information including at least one bit indicating that a cell is a service dedicated cell; and
 transmit service related information in an on demand system information.

(23) A user equipment for a mobile telecommunications system comprising circuitry configured to communicate with at least one base station, wherein the circuitry is further configured to:
 receive minimum system information including at least one bit indicating that a cell is a service dedicated cell; and
 request on demand system information including service related information, based on the at least one bit included in the minimum system information.

(24) A user equipment for a mobile telecommunications system comprising circuitry configured to communicate with at least one base station, wherein the circuitry is further configured to:
 select a communication frequency, based on a service;
 camp on a cell using the selected communication frequency;
 receive system information including service related information; and
 determine, based on the service related information, whether the cell on which it is camped provides an expected service.

(25) The user equipment of (24), wherein the circuitry is further configured to select another cell, when it is determined that the cell on which it is camped does not provide the expected service.

(26) The user equipment of (24) or (25), wherein the circuitry is further configured to determine a random access preamble and/or physical channel resources based on the service related information.

(27) A user equipment for a mobile telecommunications system comprising circuitry configured to communicate with at least one base station, wherein the circuitry is further configured to:
receive system information including service related information; and
select a cell, based on the service related information.

(28) The user equipment of (27), wherein the cell provides an expected service, which is determined based on the service related information.

(29) The user equipment of (28), wherein a cell among multiple cells is selected, which provides an expected service and which provides the strongest signal.

(30) The user equipment of anyone of (27) to (29), wherein the service related information is included in a master information block or system information block.

(31) A user equipment for a mobile telecommunications system comprising circuitry configured to communicate with at least one base station, wherein the circuitry is further configured to:
determine, upon transition from an idle state or inactive state into a connection state, whether an expected service is provided by the connected cell based on service related information included in system information received before transition into the connection state.

(32) The user equipment of (31), wherein the circuitry is further configured to select another cell, based on service related information received from the other cell, when the other cell provides the expected service.

(33) The user equipment of (32), wherein the circuitry is further configured to transmit a resume request to the other cell.

The invention claimed is:

1. A base station for a mobile telecommunications system in which at least one service is not supported by all cells, the base station comprising circuitry configured to communicate with at least one user equipment, wherein the circuitry is further configured to:
transmit minimum system information for a cell including a predefined bitmap indicating at least one service supported by the cell to the at least one user equipment, wherein the predefined bitmap includes multiple predefined bits, wherein each predefined bit indicates a unique associated predefined service supported by the cell or a unique associated predefined group of services supported by the cell such that information regarding each predefined service or group of services is m a predefined position in the predefined bitmap;
wherein the predefined bitmap includes multiple predefined bits at associated positions that together indicate all services supported by the cell.

2. The base station of claim 1, wherein predefined services include device-to-device service, multimedia broadcast multicast service, enhanced mobile broadband service, ultra-reliable low-latency communication service.

3. A base station for a mobile telecommunications system in which at least one service is not supported by all cells, the base station comprising circuitry configured to communicate with at least one user equipment, wherein the circuitry is further configured to:
transmit scheduling information for a cell, the scheduling information including a predefined bitmap having an associated predefined bit at a predefined position indicating at least one predefined service provided by the cell to the at least one user equipment, wherein the predefined bitmap includes multiple predefined bits, wherein each predefined bit indicates a unique associated predefined service supported by the cell or a unique associated predefined group of services supported by the cell such that information regarding each predefined service or group of services is in the predefined position in the predefined bitmap;
wherein the predefined bitmap includes multiple predefined bits at associated positions that together indicate all services supported by the cell.

4. The base station of claim 3, wherein the scheduling information includes scheduling information for a system information block, the system information block including service related information for the at least one predefined service provided by the cell.

5. The base station of claim 3, wherein predefined services include device-to-device service, multimedia broadcast multicast service, enhanced mobile broadband service, ultra-reliable low-latency communication service.

6. A base station for a mobile telecommunications system in which includes at least one service dedicated cell that does not support at least one service, the base station comprising circuitry configured to communicate with at least one user equipment, wherein the circuitry is further configured to:
transmit information in a master information block for a cell indicating that the cell is a service dedicated cell to the at least one user equipment; and transmit system information including a predefined bitmap having an associated bit at a predefined position indicating at least one predefined service provided by the service dedicated cell to the at least one user equipment, wherein the predefined bitmap includes multiple predefined bits, wherein each predefined bit indicates a unique associated predefined service supported by the cell or a unique associated predefined group of services supported by the cell such that information regarding each predefined service or group of services is in the predefined position in the predefined bitmap;
wherein the predefined bitmap includes multiple predefined bits at associated positions that together indicated all services supported by the cell.

7. The base station of claim 6, wherein the information includes an associated bit at a predetermined position for indicating that the cell is a service dedicated cell.

8. The base station of claim 6, wherein predefined services include device-to-device service, multimedia broadcast multicast service, enhanced mobile broadband service, ultra-reliable low-latency communication service.

* * * * *